(12) United States Patent
Pickering

(10) Patent No.: US 6,704,708 B1
(45) Date of Patent: Mar. 9, 2004

(54) INTERACTIVE VOICE RESPONSE SYSTEM

(75) Inventor: John Brian Pickering, Winchester (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/552,907

(22) Filed: Apr. 20, 2000

(30) Foreign Application Priority Data

Dec. 2, 1999 (GB) .............................................. 9928420

(51) Int. Cl.[7] .............................................. G10L 15/26
(52) U.S. Cl. ........................ 704/235; 704/207; 704/270
(58) Field of Search ................................ 704/235, 243, 704/246, 249, 251, 252, 209, 207, 256, 270; 379/88.01

(56) References Cited

U.S. PATENT DOCUMENTS

| | | | |
|---|---|---|---|
| 5,027,406 A | * 6/1991 | Roberts et al. | ............. 704/244 |
| 5,577,165 A | * 11/1996 | Takebayashi et al. | ....... 704/275 |
| 5,745,873 A | 4/1998 | Braida et al. | |
| 5,884,260 A | * 3/1999 | Leonhard | .................... 704/254 |
| 6,289,305 B1 | * 9/2001 | Kaja | ........................... 704/219 |
| 6,292,775 B1 | * 9/2001 | Holmes | ...................... 704/209 |
| 6,505,152 B1 | * 1/2003 | Acero | ........................ 704/209 |

OTHER PUBLICATIONS

Sawusch "effects of suration and formant movement on vowel perception", IEEE, pp 2482–2485.*

* cited by examiner

Primary Examiner—Daniel Abebe
(74) Attorney, Agent, or Firm—Akerman Senterfitt

(57) ABSTRACT

This invention relates to an interactive voices recognition system and in particular relates to speech recognition processing within an interactive voice response (IVR) system. One problem with speech recognition in an IVR is that two time intensive tasks, the speech recognition and forming a response based on the result of the recognition are performed one after the other. Each process can take up time of the order of seconds and the total time of the combined processes can be noticeable for the user. There is disclosed a method for processing in an interactive voice processing system comprising: receiving a voice signal from user interaction; extracting a plurality of formant values from the voice signal; calculating an average of the formants; locating look ahead text associated with a closest reference characteristic as an estimate of the full text of the voice signal. Thus the invention requires only acoustic analysis of a first portion of a voice signal to determine a response. Since it does not require full linguistic analysis of the signal to convert into text and then a natural language analysis to extract the useful meaning from the text considerable processing time is saved.

23 Claims, 6 Drawing Sheets

INTERACTIVE VOICE RESPONSE SYSTEM

FIELD OF INVENTION

This invention relates to an interactive voice response system and in particular relates to speech recognition processing within an interactive voice response (IVR) system.

BACKGROUND OF INVENTION

In today's business environment, the telephone is used for many purposes: placing catalogue orders; checking airline schedules; querying prices; reviewing account balances; notifying customers of price or schedule changes; and recording and retrieving messages. Often, each telephone call involves a service representative talking to a caller, asking questions, entering responses into a computer, and reading information to the caller from a terminal screen. This process can be automated by substituting an interactive voice response system with speech recognition for the operator.

A business may rely on providing up-to-date inventory information to retailers across the country and an interactive voice response system can be designed to receive orders from customers and retrieve the data they request from a local or host-based database via a business application. The IVR updates the database to reflect any inventory activity resulting from calls. The IVR enables communications between a main office business application and a marketing force. A sales representative can obtain product release schedules or order product literature anytime, anywhere, simply by using the telephone. A customer can inquire about a stock item, and the IVR can determine availability, reserve the stock, and schedule delivery.

A banking application using an IVR with speech recognition includes the following sequence of steps. A prompt is played to the caller and the caller voices a response. The voice signal is acquired and speech recognition is performed on the voice signal to create text. Only once the speech recognition is finished and the text is formed is the text response analyzed and processed for a result which may be played to the caller. For instance the user may ask how much money in his savings account and the speech recognition engine processes the whole signal so that a Natural Language Understanding (NLU) module can extract the relevant meaning of 'savings account balance'. This result is passed to a banking application to search and provide the answer.

One problem with the above voice activated database query type application is that two time intensive tasks are performed one after the other. It is known for a voice input to be processed to text and this input to be used as the basis for a query to be processed on a database. Each process can take up time of the order of seconds and the total time of the combined processes can be noticeable to the user. It would be desirable to reduce the total time for a voice recognition and database query. Moreover this has a related cost summary.

It is known to predict certain speech elements in advance of a full analysis. U.S. Pat. No. 5,745,873 discloses a method for recognising speech elements (e.g. phonemes) in utterances including the following steps. Based on acoustic frequency, at least two different acoustic representatives are isolated for each of the utterances. From each acoustic representative, tentative information on the speech element in the corresponding utterance is derived. A final decision on the speech element in the utterance is then generated, based on the tentative decision information from more than one of the acoustic representatives. Advantage is taken of redundant cues present in elements of speech at different acoustic frequencies to increase the likelihood of correct recognition. Speech elements are identified by making tentative decisions using frequency-based representations of an utterance, and then by combining the tentative decisions to reach a final decision. This publication discloses that a given sub-band section (in this case a frequency band) of speech contains information which may be used to predict the next sub-band section. One aspect is to get a more accurate recognition result by separately processing frequency bands.

However the above solution is still a sequential process in a voice application and the total time taken is still the combined time of the speech recognition and the later processing.

SUMMARY OF INVENTION

In one aspect of the invention there is provided a method for processing in an interactive voice processing system comprising: receiving a voice signal from user interaction; extracting a plurality of measurements from the voice signal; calculating an average of said measurements; locating a reference characteristic matching said average; and using text associated with the closest reference characteristic as an estimate of the text of the voice signal.

Thus the invention requires only acoustic analysis of a voice signal to determine a response. Since it does not require phonetic analysis of the signal to convert into text and then a natural language analysis to extract the useful meaning from the text considerable processing time is saved.

In a preferred embodiment the acoustic feature is a non-phonetic feature extracted from a frequency analysis of the voice signal. More than one non-phonemic feature of the voice signal may be acquired and used to determine the response. For instance, it is known that the acoustic effects of nasalisation, including increased bandwidths, will spread forward and backward through many segments.

Certain predictive qualities can be found in speech signals. In purely linguistic terms, articulatory settings shift during speech towards those of the prosodically marked element within a given breath group. There exist significant differences between average formant frequencies and related acoustic parameters in the "same" carrier phrase according to the segmental content of a prosodically marked (stressed) item within the breath-group. When presented with very short, and increasing portions of speech, subjects are able to predict what a complete utterance or word may be. These predictive capabilities, based either on significant differences within the signal itself, or on top-down (i.e. prior) knowledge, or both, to enhance the performance of advanced ASR and NLU/Dialogue Management-enabled services: during recognition, predications can be made as to what the most likely and significant information is in the phrase. Such predictions could be used to activate natural language understanding (NLU) and the task specific dialogue management modules which would therefore be able to return a possible result (or N-Best possibilities) to the application or service before the speaker has finished speaking. This would lead to increased response-times, but could also be used to cater for poor transmission rates in offering the most likely responses even before the complete signal has been received effectively subsetting the total number of possible responses. Further, a running check between predictions and the result of actual recognition would help provide a dynamic indicator of how effective (i.e. how accurate) such predictions were for a specific instance: allowing greater or lesser reliance on such predicted responses on a case-by-case basis.

In the preferred embodiment only that portion of the speech signal received to date is analyzed. Significant differences in that signal as compared with other signals with the same linguistic content (the "same" sounds and words) are used to predict the later, as yet unanalyzed, portion of the signal.

The acoustic processing is performed to acquire characteristics of the voice signal which have the relevant predictive characteristics and are more accessible and quicker to calculate. For instance, to perform full speech analysis on a phrase the whole phrase must be acquired so that a rough speech analysis of a ten second phrase using a 400 MHz processor can take additional time on top of the 10 seconds of speech. Whereas the initial acoustic characteristics of a voice signal may be obtained in the first second or seconds before the speech is even completed.

Due to the relatively low variation of the queries input to the voice system (compared with say a general Internet searching engine) the probability of selecting text on the basis of the acoustic signal can be expected to be high. This is increasingly so for a voice application with limited functionality when the expected voice inputs do not vary significantly.

In the preferred embodiment the acoustic feature is average formant information of frequency samples of the voice signal. For instance the first, second, third and fourth formants values give unique and valuable characteristics about a voice signal. An average first and second formant (formant centroid) and average excursion from the centroid are also unique and valuable characteristics.

In a preferred embodiment look ahead text is associated with a particular acoustic feature or feature set. More preferably, the text comprises the key words necessary to determine a response. This avoids the associated text being processed by natural language understanding methods to extract the key words.

One of the problems with the above approach is that the acoustic information may not be sufficiently unique to make the best match of predicted phrases. A solution therefore is to make a prediction of the phrase, querying a business application with predicted keywords in the phrase to get a predicted result while at the same time performing full speech recognition on the voice signal. The predicted text or keywords are compared with the speech recognition result and if the comparison is close enough the predicted result is used. If not close enough, the speech recognition text is processed to extract key words and the business application is queried again. With this iterative approach, the time saving of not performing speech recognition and natural language understanding is maintained for correctly predicted phrases.

In another aspect of the invention there is provided method for processing in an interactive voice processing system comprising: Receiving a voice signal from user interaction; extracting a plurality of characteristics from a first portion of the voice signal; locating a reference characteristic matching said plurality of measurements; and using text associated with the closest reference characteristic as an estimate of the text of the whole voice signal.

Advantageously the characteristics from the first portion of the voice signal include average formant information. More advantageously the characteristics from the first portion of the voice signal include a first phoneme or first group of phonemes. Furthermore formant information and the phoneme information is used together to estimate the text of the whole voice signal.

According to a further aspect of the invention there is provided an interactive voice response (IVR) system comprising: means for receiving a voice signal from user interaction; means for extracting a plurality of measurements from the voice signal; means for calculating an average of said measurements; means for locating a reference characteristic matching said average; and means for using text associated with the closest reference characteristic as an estimate of the text of the voice signal.

BRIEF DESCRIPTION OF DRAWINGS

In order to promote a fuller understanding of this and other aspects of the present invention, an embodiment will now be described, by way of example only, with reference to the accompanying drawings in which.

DETAILED DESCRIPTION OF PREFERRED EMBODIMENT

Figure 1:
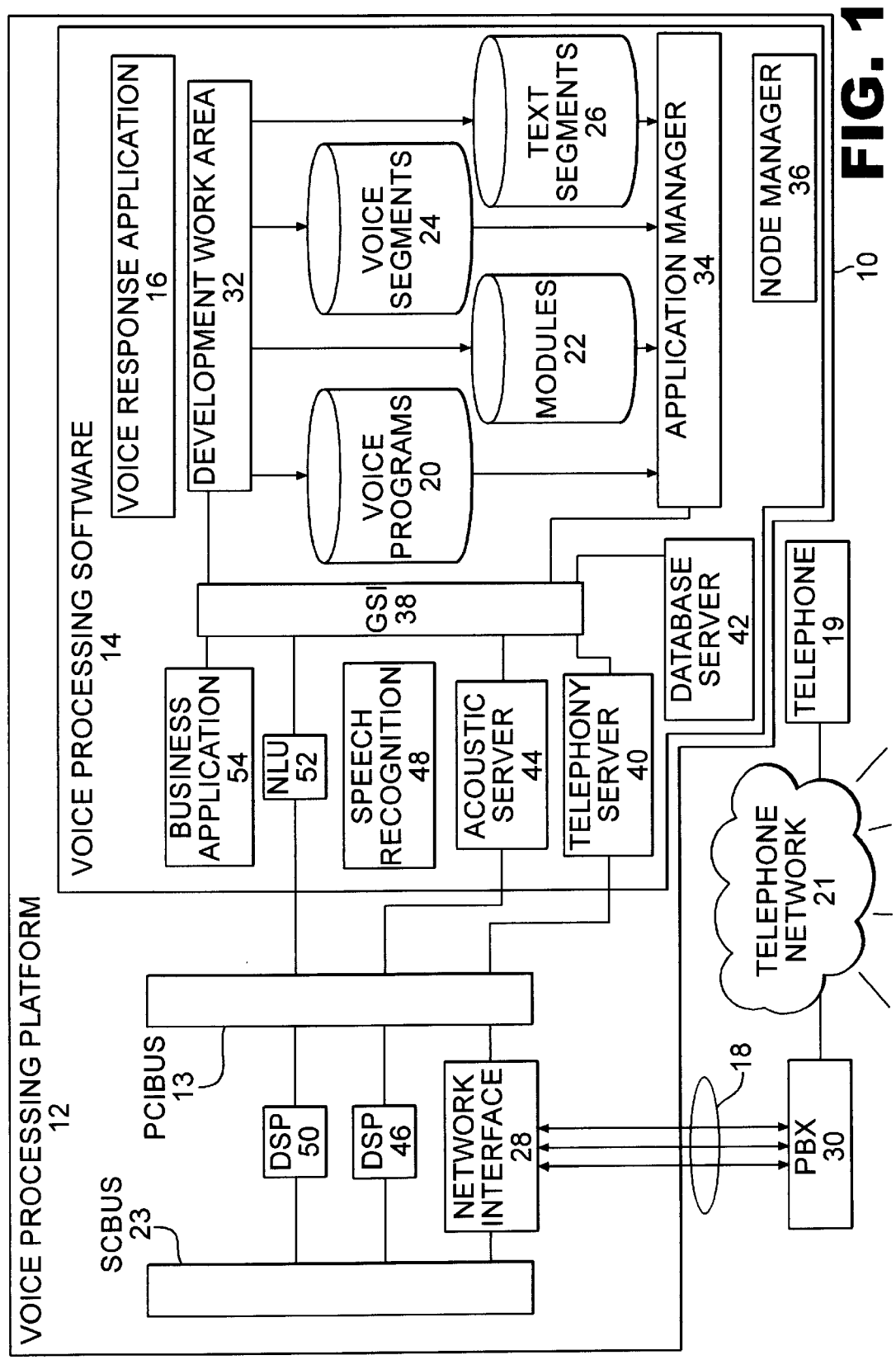
FIG. 1 is a schematic representation of a voice processing platform of the present embodiment.

Referring to FIG. 1, there is shown a schematic representation of a voice processing platform of the present embodiment. A voice response system 10 of the present embodiment comprises: voice processing platform 12 and voice processing software 14 such as IBM Voice Response for Windows (previously known as IBM DirectTalk/2); a Voice Response application 16; and telephone lines 18 to connect callers to the voice system (see FIG. 1). The following hardware and software is required for the basic voice processing system platform 12: a personal computer, with an Industry Standard Architecture (ISA) bus or a Peripheral Component Interconnect (PCI) bus, running Microsoft Windows NT; one or more Dialogic or Aculab network interface cards for connecting the required type and number of telephone lines to Voice Response for Windows; and one or more Dialogic voice processing cards. the IBM Corporation.)

IBM's Voice Response for Windows is a powerful, flexible, yet cost-effective voice-processing platform for the Windows NT operating system environment. Although the embodiment is described for Windows, an equivalent platform is also available for the UNIX environment from the IBM Corporation. Used in conjunction with voice processing hardware, Voice Response can connect to a Public Telephone Network directly or via a PBX. It is designed to meet the need for a fully automated, versatile, computer telephony system. Voice Response for Windows NT not only helps develop voice applications, but also provides a wealth of facilities to help run and manage them. Voice Response can be expanded into a networked system with centralized system management, and it also provides an open architecture, allowing customisation and expansion of the system at both the application and the system level.

Application 16 consists of programmed interaction between the voice system and a caller. Voice application 16 consists of one or more voice programs 20 that control the interactions between callers and the various functions of Voice Response. Applications are written in Telephony REXX (T-REXX), which incorporates the power and ease-of-use of IBM REXX programming language. Voice programs also use modules 22 that control the playing of recorded voice segments 24 or synthesized text segments 26.

IBM Voice Response for Windows NT supports up to 60 E1 or 48 T1 or analog telephone lines 18 on a single personal computer. Voice Response for Windows NT is connected to telephone lines through standard voice communications cards 28. The telephone lines can come directly from the public telephone network or through a private branch exchange (PBX) 30. If call volumes require (or will grow to require) more than 60 E1 or 48 T1 or analog lines, additional Voice Response for Windows NT systems can be installed and connected together through a LAN. All systems connected together through a LAN can be managed from a single node.

Within a voice system the function of several different cards, for example voice recognition and text-to-speech may be made available on each of a number of telephone lines by connecting the cards together with a System Computing Bus (SCbus) 23 cable.

The voice processing 14 software consists of a number of components, each designed to perform, or to help you to perform a specific task or tasks related to a voice processing system. A development work area 32 allows the creation and modification of a voice-processing application. An application manager 34 runs the application. A node manager 36 allows monitoring of the status of application sessions and telephone lines and allows the issue of commands to start and stop application sessions. A general server interface 38 manages all communications between the component programs of Voice Response for Windows NT.

Voice Response components use a set of defined actions to cover most of the common functions required by voice programs to perform voice processing tasks. The components also use a number of APIs to enable the creation of customized actions, servers, and clients. The development work area 32 and the node manager 36 are interactive applications each of which can be started from the Windows NT Start menu, or the Voice Response folder to interact with callers. The application manager runs the application in a production environment. When the system is configured, it must determine how the telephone lines will be used for the specific needs of the business. IBM Voice Response for Windows NT system can run up to 60 applications simultaneously. This can range from one application running on all 60 lines to 60 different applications each running on a separate line.

Node manager 36 manages the Voice Response for Windows system. It is used to monitor and alter the current status of voice application sessions or telephone lines. The node manager monitors real-time status information and accumulated statistics on each path of a network node. For example, it can start or stop an application session, view its log file, enable or disable a telephone line, or check the status of a terminal emulation session.

A Voice Response client is a program that requests information or services from other Voice Response for Windows NT programs. A Voice Response server is a Voice Response for Windows program that provides services to Voice Response for Windows NT clients. A variety of services are required, such as playing recorded voice segments or reading a database. The application manager 34 requests these services from the telephony server 40 or database server 42. The modular structure of Voice Response for Windows NT and the open architecture of the general server interface (GSI) allows development of clients and servers that are unique to specific applications. A user-defined server can provide a bridge between Voice Response for Windows NT and another product that has an open architecture.

The voice processing software 14 further comprises a telephony server 40 which interfaces the network interface 28, a database server 42 which provides database functionality; acoustic server 44 to analyze the acoustic characteristics of incoming voice signals from telephone callers using a digital signal processor (DSP) 46 receiving the voice signal on SCBus 23; a speech recognition server 48 for performing speech-to-text on a voice signal using digital signal processor 50 receiving the voice signal on SCBus 23; natural language understanding server 52; and business application server 54. Although the speech recognition is performed in hardware for this embodiment, the speech-to-text conversion may also be entirely in software.

Acoustic server 44 and DSP 46 provide the frequency analysis required by the embodiment. In operation, the voice application 16 requests the voice pre-processor server 44 for the predicted text of the voice signal and receives a response over the GSI 38.

Natural language understanding (NLU) server takes text phrases from either the acoustic feature look-up table or the speech recognition and extracts the keywords for processing by the business application.

Business application takes the keyword from either the NLU or the acoustic feature lookup table and performs a database query using the keywords. The result of the query, for instance an account balance, is used in the next prompt to the caller.

Figure 2:
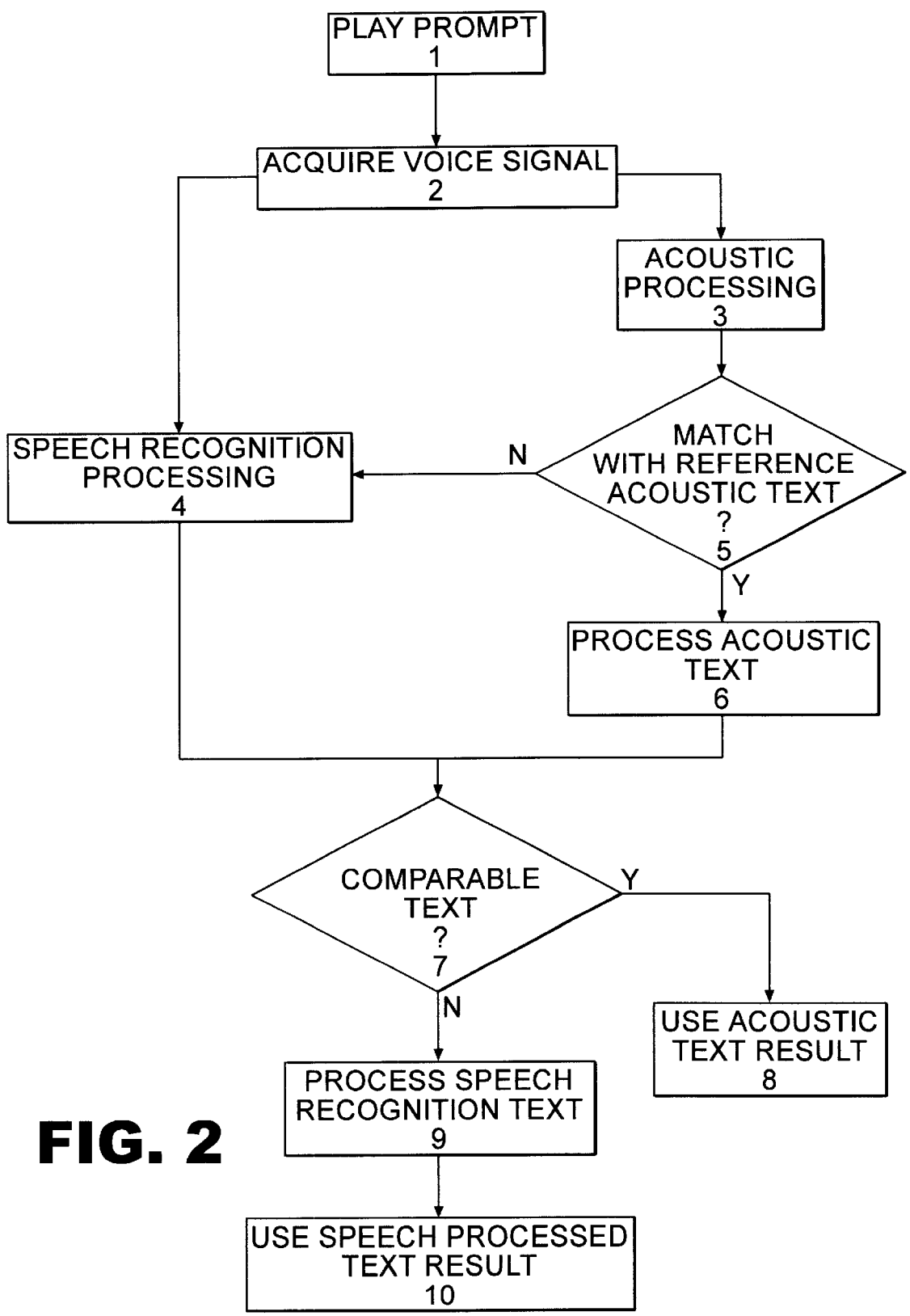
FIG. 2 is a schematic method diagram of the embodiment.

The voice response application 16 of the embodiment is represented in FIG. 2 as a flow diagram. The steps may be contrasted with the prior art steps in the background steps to emphasise the differences. A prompt is played (step 1) to the caller and the caller voices a response and the voice signal is acquired (step 2). The signal is analyzed by acoustic processing (step 3) and speech recognition processing (step 4) in parallel. Once the acoustic characteristics have been extracted, they are matched (step 5) to reference values for a best fit. If a fit is made, the corresponding text to that fit is taken, in the first instance, to be the text of the voice signal. Processing (step 6) is performed on the predicted text independent of the speech recognition process. In this case, natural language understanding extracts the key words from the predicted text to form a query along with the identification of the caller. The query is passed on to a business application and, in time, a result is received back in answer. Before or after the acoustic result is received, the text of the speech recognition is available and compared (step 7) with the predicted acoustic text. If the texts or words within the texts are substantially similar, then the process allows the result acquired from the acoustic prediction (step 8). If the texts or words within the texts are not similar, then the result acquired from the acoustic prediction is voided. The text generated from the speech recognition in step 5 is now used to form a database query using natural language extraction and passed to the business application. The result from the business server is used in the next response of the voice application. The matching of the acoustic data to the reference values (step 5) is performed using a known statistical method such as a least means squares fit, however, in other embodiments, Markov modelling or neural networks may also be used to calculate the most probable fit from the references. A percentage value is calculated and values of above a threshold, such as 80%, taken as legitimate and the best value taken as the predicted text. All values below the threshold are ignored and deemed too far off the mark.

An enhancement to the present embodiment uses real time phoneme extraction from the voice recognition process to hone the acoustic matching. If the predicted text does not have the first phoneme, it is still possible that another prediction could be matched. In this case, a new match is made on the basis of restricting the acoustic data set searched over by the first or subsequent phonemes and a new prediction made. This cycle could be repeated until there are no more texts in the acoustic text table having the initial phoneme sequence or the acoustic matching produces too low a value (below 80%) for a proper match to be made.

Figure 3:
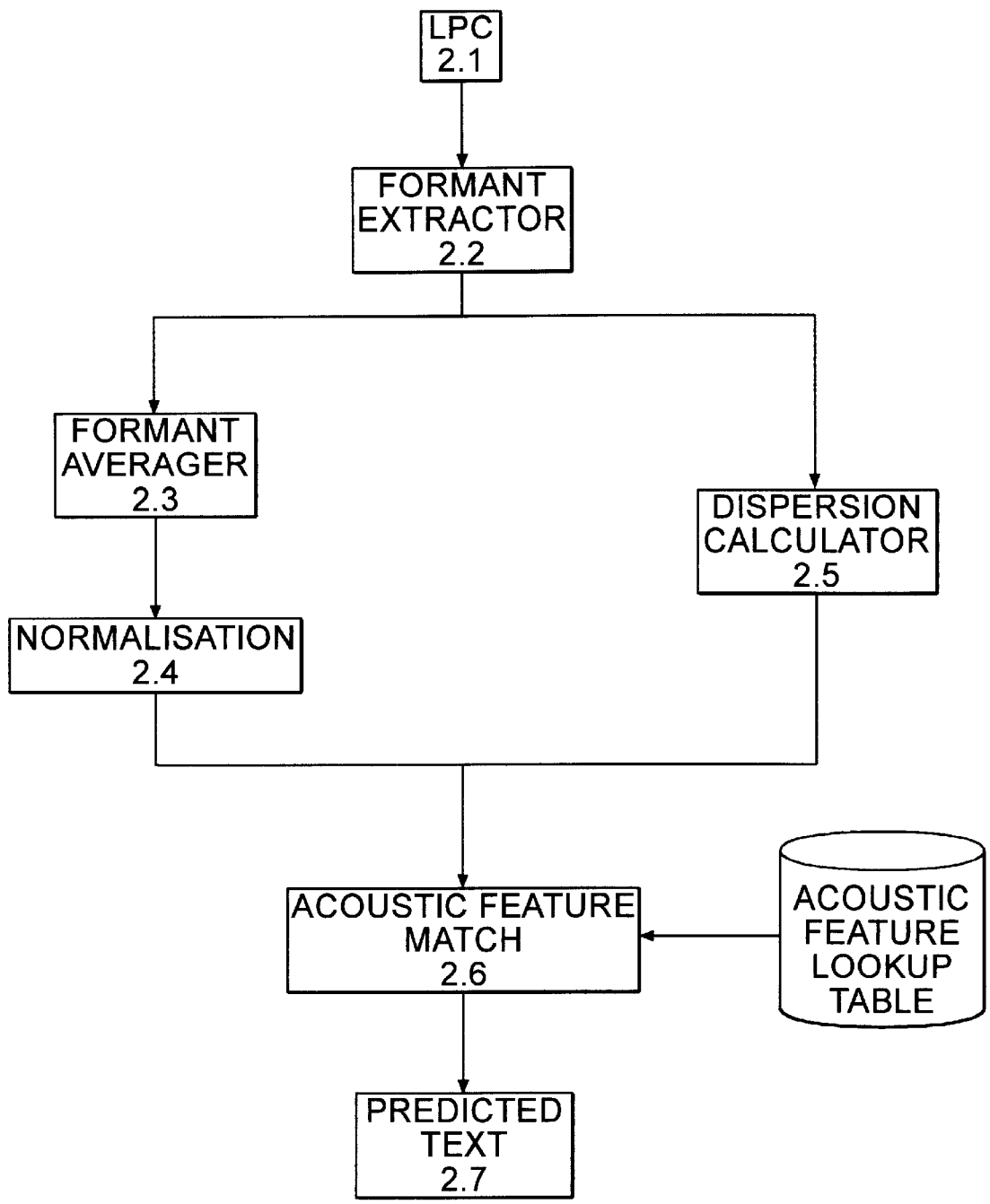
FIG. 3 is a schematic method of an acoustic processing step of FIG. 2.

Acoustic server 44 and DSP 46 are represented by the method diagram of FIG. 3. The method comprises frequency analysis of the voice signal by a linear predictive coding device (LPC) (step 2.1) and extraction of the formants (step 2.2). The formants are averaged (step 2.3) and normalised (step 2.4). Furthermore an average dispersion is calculated (step 2.5). The extracted formant values are matched (step 2.6) against reference values in an acoustic feature lookup table and text associated with the matched values offered as predicted text to the voice application (step 2.7).

The LPC 50 extracts the fundamental frequency (FO) contour and provides the spectral polynomial (see FIG. 3) for the formant extractor 52. LPC 50 also provides a bandwidth estimation (−3 dB down) for the formants and a short-term spectral analyzer such as based on 256 point, Hamming windowed section of speech from the original signal. Linear predictive coding (LPC) is a well known computational method which can be used for formant centre frequencies and bandwidths from digitised samples of the time-domain waveform of a vowel. The method depends on the structure of the time-domain waveform of an epoch of speech and on the assumption of complete, mutual independence of source and filter. The waveform of a voiced vowel has a more or less regular structure over any short portion of the vowel's duration. Therefore, the value of a given sample from the wave form can be predicted, albeit with some error, from the values of n of its immediate predecessors. The prediction takes the form of a linear equation with constant coefficients. Implementing LPC then becomes a problem of finding values for the coefficients that minimise the prediction error. Linear prediction is also the preferred method for estimating formant centre frequencies and bandwidths. The order of the analysis (the value of n is usually set to between 12 and 16, providing 6 to 8 poles). The analysis window is usually 128, 256 or 512 samples wide. Smaller windows begin to yield unstable results, while larger windows may smear important changes that the prediction coefficients would otherwise undergo. When dealing with natural speech, formant parameter values are determined within an analysis window that is shifted forward in time every 50 ms or so. This rate of shifting is fast enough to represent the effects of changes in the positions of articulators. The resulting formant centre frequencies and bandwidths then can be treated as functions of time. LPC analysis also can produce a smoothed spectrum representing the action of a filter that includes the effects of source spectrum, vocal-tract resonances, and lip radiation.

The formant extractor 52 takes the waveform polynomial from the LPC for each sample and establishes the centre frequencies of two formants, F1 and F2, by calculating the maxima of the polynomial. This process can be carried out by known algorithms for example in Appendix 10 of 'Fundamentals of speech signal processing' by Shuzo Saito and Kazuo Nakata, Academic Press. F2 may be the physical formant (the second major resonance of the vocal tract) or F2', being a weighted average of F2, F3 and F4. Formant theory as applied to voice signals is explained in greater detail in "Vowel Perception & Production", B. S. Rosner and J. B. Pickering, Oxford University Press.

Figure 4:
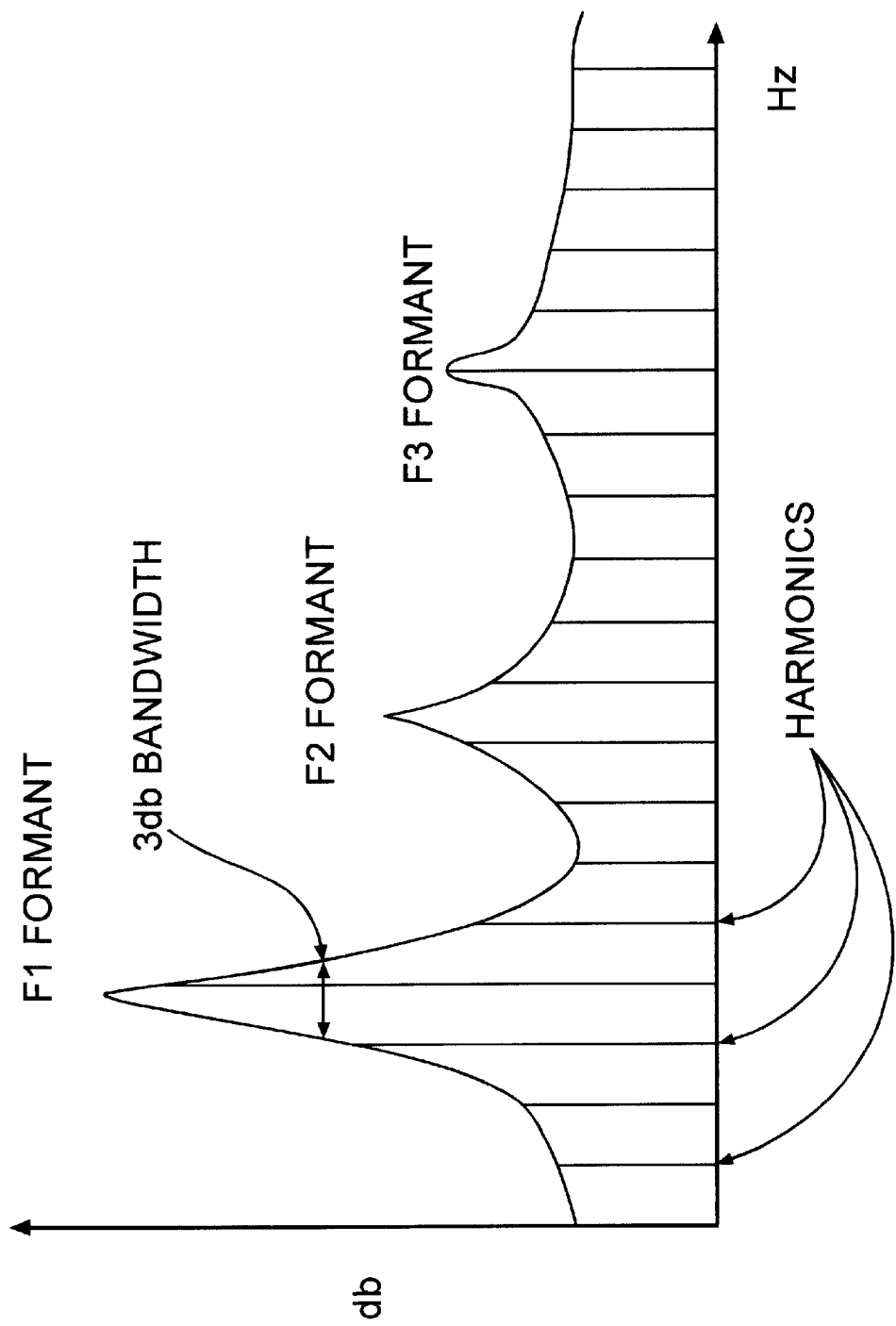
FIG. 4 is a spectral analysis of a voice signal.

Phoneticians have traditionally used a two-dimensional graph, the vowel quadrilateral, to display key features of vowel production and FIG. 4 shows a variant on the quadrilateral that Daniel Jones suggested (see Jones, "An outline of English phonetics", 1960, W.Heffer & Sons, Cambridge). The horizontal dimension of the chart represents tongue advancement, while the vertical dimension indicates tongue height.

Figure 6:
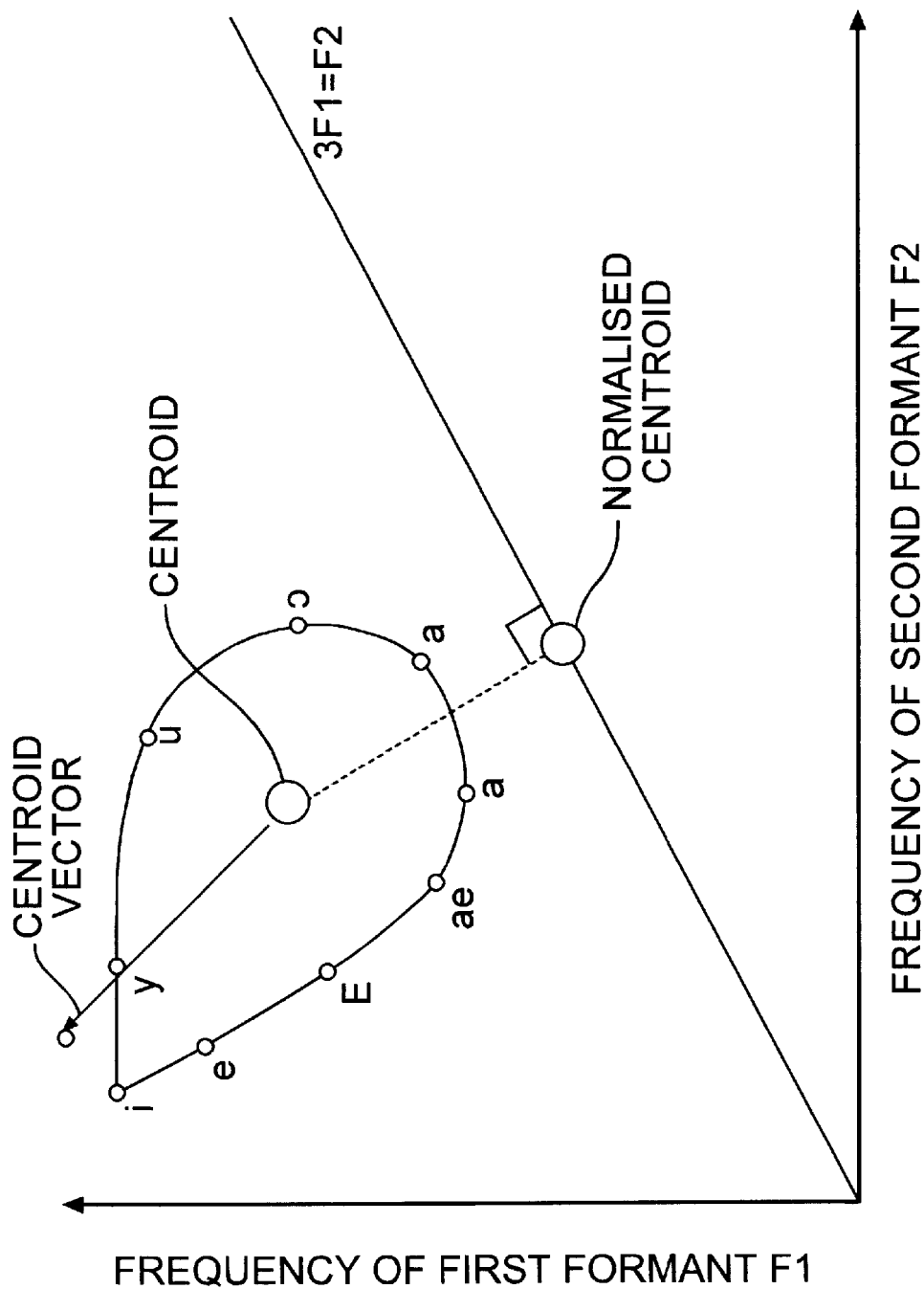
FIG. 6 shows an analysis of a voice signal in formant space.

The boundaries of the chart are taken directly from Jones's representation. The corners and the points of intersection of the boundary with the horizontal lines define eight of his cardinal vowels. The symbols in FIG. 6 give the articulatory positions for various vowels. The vowel chart suggested by Jones was later carried over as a way of representing vowels acoustically in a two-dimensional space. For each vowel, the centre frequencies F1 and F2 are determined for the first two formants. To represent a vowel in the acoustic plane, the frequency values of F1 and F2 are obtained at the 'middle' of the vowel, from LPC. In the simplest form of the acoustic plane, the values for F2 are then plotted against those for F1. The origin of the plane is placed in the right-hand upper corner. The F1 axis becomes vertical, and the F2 axis becomes horizontal. The F2/F1 chart can be read in either of two isomorphic ways: as a representation of formant centre frequencies or as a representation of peak frequencies in the spectral envelope of the radiated acoustic signal at the lips.

What the embodiment seeks to utilise is the extra information contained in these acoustic features which give some clues about the future content of an utterance.

A significant shift in the underlying articulatory setting in preparation for the production of the periodically marked item will result in a small but significant shift in the average formant values across the whole utterance. The principle is that a word positioned at the end of phrase can alter the acoustic properties as measured at the beginning.

FIG. 6 shows a set of vowels plotted in the F2/F1 acoustic plane. This part of the figure contains points for sustained unrounded and rounded vowels spoken by a native speaker of a language such as English. In some acoustic charts, the origin of the plane is placed in the usual lower left-hand position, making F1 and F2 axes horizontal and vertical respectively. The F2/F1 plane gives a convenient way of representing a given vowel system and of depicting differences in vowel systems between languages or dialects. Each member of a vowel system assumes a specific position in the F2/F1 plot. The points in the plot form a particular configuration. The vowels of different languages generate different configurations in the F2/F1 plane. Languages with few vowels have only a few points on the plane. Languages with many vowels yield numerous points. Two languages that seem to share a vowel produce points that coincide with, or are close to, one another.

Figure 5:
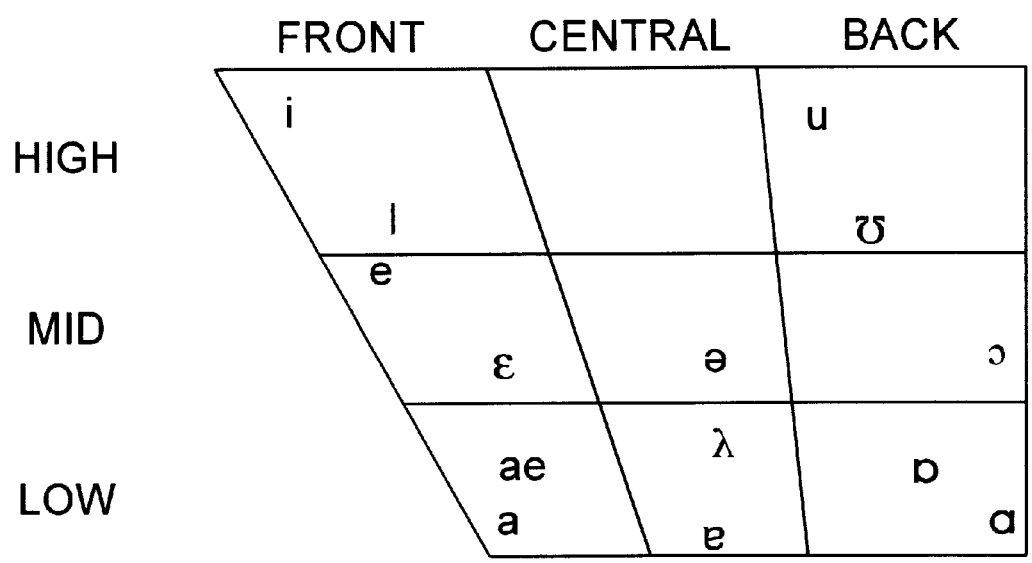
FIG. 5 is a theoretical representation of vowels in formant space.

Averaging the formants in step 2.3 takes each individual value of F1 and F2 and calculates the centroid (see solid circle in FIG. 5) being the running average of F1 and F2 (or F2') from the onset to the end of the signal (or to the current location); this calculation should only be done for fully voiced speech which corresponds to values of the fundamental FO with a normal range.

Calculation of the excursion in step 2.5 takes each individual value for F1 and F2 and calculates the average excursion from the centroid, i.e. for each 256 point spectral section of fully voiced speech. (See solid arrow in FIG. 5). Using basic acoustic theory and approximating the vocal tract to a closed tube, it is possible to predict for any loss-less system, the expected formant frequencies, and therefore the centroid and average excursion. For instance, for a 17.5 cm vocal tract and a set of quasi Cardinal vowels, 3F1=F2 where F1=500 Hz and F3=1500 Hz. This predicted centroid is the nominal centroid and the predicted excursion, the nominal excursion.

Normalisation (step 2.4) takes the centroid (F1 and F2) for this speech sample and calculates the nearest point on the line of the nominal predicted centroid (3F1=F2). This shift is only to take the centroid towards the nominal predicted centroid and F1 and F2 for the normalised centroid should retain the same ratio as before normalisation. The nominal prediction yields a 3:1 ratio on a linear Hertz scale. A useful normalised output is a measure of how far the centroid is from the theoretical ratio, that is the ratio of the specific formants F2/F1 minus 3. Another useful value is the ratio of the specific average formants to the theoretical average formants F2(specific average)/ F2 (theoretical average) and F1 (specific average)/ F1 (theoretical average).

The acoustic feature matching step (2.6) takes input from the formant values to find the best match text in an the acoustic feature lookup table of FIG. 3. The acoustic feature lookup table comprises a plurality of records. Each record contains acoustic features and corresponding memorised text phrase. An example layout of the acoustic feature lookup table is given below for seven records D1 to D7. The 'acoustic characteristic' is the deviation from the expected centroid position and the expected excursion value. Each record (D1 to D7) has a text field storing the relevant text and an acoustic characteristic field storing the corresponding acoustic characteristic (AC1 to AC7). The table may be part of the acoustic server 44 or accessed by the database server 42.

Feature Lookup Table

| No. | Text | Acoustic characteristics |
|-----|------|--------------------------|
| D1 | 'Tell me how much money I have in my current account' | AC1 |
| D2 | 'Tell me how much money I have in my savings account' | AC2 |
| D3 | 'How much money have I got in my current account' | AC3 |
| D4 | 'How much money have I got in my savings account' | AC4 |
| D5 | 'What is the balance of my current account' | AC5 |
| D6 | 'What is the last transaction on my current account' | AC6 |
| D7 | 'What is the referral date on my current account' | AC7 |

A further enhancement to the embodiment is for the acoustic feature look up table to contain both memorised text and separated key words to eliminate the NLU processing which would normally identify the key words. In this way the processing of the acoustic text is made even faster. It will be appreciated by those skilled in the art that any speech-enabled automated service, such as one based on the Worldwide Web, could also benefit from this embodiment.

IBM Voice Response is a trademark of IBM Corporation.

Microsoft, and Microsoft Windows NT are trademarks of Microsoft Corporation.

Dialogic is a trademark of Dialogic Corporation.

Aculab is a trademark of Aculab Corporation.

In summary this invention relates to an interactive voice recognition system and in particular relates to speech recognition processing within an interactive voice response (IVR) system. One problem with speech recognition in an IVR is that two time intensive tasks, the speech recognition and forming a response based on the result of the recognition are performed one after the other. Each process can take up time of order of seconds and the total time of the combined processes can be noticeable for the user. There is disclosed a method for processing in an interactive voice processing system comprising: receiving a voice signal from user interaction; extracting a plurality of formant values from the voice signal; calculating an average of the formants; locating look ahead text associated with a closest reference characteristic as an estimate of the full text of the voice signal. Thus the invention requires only acoustic analysis of a first portion of a voice signal to determine a response. Since it does not require full phonetic analysis of the signal to convert into text and then a natural language analysis to extract the useful meaning from the text considerable processing time is saved.

Now that the invention has been described by way of a preferred embodiment, various modifications and improvements will occur to those person skilled in the art. Therefore it should be understood that the preferred embodiment has been provided as an example and not as a limitation.

What is claimed is:

1. A method for processing in an interactive voice processing system comprising:

receiving a voice signal from user interaction;

extracting a plurality of formant values from the voice signal over a time period;

calculating an average of said extracted formant values in the frequency domain over said time period;

locating a reference characteristic matching said average; and using a word or words associated with the closest reference characteristic as an estimate of the text of the voice signal.

2. A method as claimed in claim 1 wherein only a first proportion of the voice signal is used to extract the plurality of measurements.

3. A method as claimed in claim 1 wherein a first and second formant (formant centroid) and average excursion from the centroid are extracted and averaged over said time period.

4. A method as claimed in claim 3 wherein the text associated with the closest reference represents the full text of the voice signal.

5. A method as claimed in claim 3 wherein the text associated with the closest reference represents the keywords of the voice signal.

6. A method as claimed in claim 5 further comprising the steps of:

determining a response to the user based on the estimated text of the voice signal.

7. A method as claimed in claim 6 wherein the response is based on performing a search using keywords of the estimated text.

8. A method for processing in an interactive voice processing system comprising:

receiving a voice signal from user interaction;

extracting a plurality of formant values from the voice signal;

calculating an average of said formant values in the frequency domain, wherein a first and second formant (formant centroid) and average excursion from the centroid are extracted and averaged;

locating a reference characteristic matching said average;

using a word or words associated with the closest reference characteristic as an estimate of the text of the voice signal, wherein the text associated with the closest reference represents the keywords of the voice signal;

determining a response to the user based on the estimated text of the voice signal, wherein the response is based on performing a search using keywords of the estimated text;

performing speech recognition on the voice signal;

comparing the text of the speech recognition with the estimated text; and using the determined response if the text are comparable.

9. A method for processing in an interactive voice processing system comprising:

receiving a voice signal from user interaction;

extracting a plurality of characteristics from a first portion of the voice signal over a time period, wherein the extracted characteristics from the first portion of the voice signal include average formant information;

locating a reference characteristic matching said plurality of characteristics over said time period; and using text associated with the closest reference characteristic as an estimate of the text of the whole voice signal.

10. A method as claimed in claim 9 wherein the extracted characteristics from the first portion of the voice signal include a first phoneme or first group of phonemes.

11. A method as claimed in claim 10 wherein formant information and the phoneme information is used together to estimate the text of the whole voice signal.

12. An interactive voice response (IVR) system comprising:

means for receiving a voice signal from user interaction;

means for extracting a plurality of formant values from the voice signal over a time period;

means for calculating an average of said extracted formant values in the frequency domain over said time period;

means for locating a reference characteristic matching said average; and means for using a word or words associated with the closest reference characteristic as an estimate of the text of the voice signal.

13. An IVR as claimed in claim 12 wherein only a first proportion of the voice signal is used to extract the plurality of measurements.

14. An IVR as claimed in claim 12 wherein a first and second formant (formant centroid) and average excursion from the centroid are extracted and averaged over said time period.

15. An IVR as claimed in claim 14 wherein the text associated with the closest reference represents the full text of the voice signal.

16. An IVR as claimed in claim 14 wherein the text associated with the closest reference represents the keywords of the voice signal.

17. An IVR as claimed in claim 16 further comprising means for determining a response to the user based on the estimated text of the voice signal.

18. An IVR as claimed in claim 17 wherein the response is based on performing a search using keywords of the estimated text.

19. An interactive voice response (IVR) system comprising:

means for receiving a voice signal from user interaction;

means for extracting a plurality of formant values from the voice signal;

means for calculating an average of said formant values in the frequency domain, wherein a first and second formant (formant centroid) and average excursion from the centroid are extracted and averaged over said time period;

means for locating a reference characteristic matching said average; and means for using a word or words associated with the closest reference characteristic as an estimate of the text of the voice signal, wherein the text associated with the closest reference represents the keywords of the voice signal;

means for determining a response to the user based on the estimated text of the voice signal;

means for performing speech recognition on the voice signal;

means for comparing the text of the speech recognition with the estimated text; and means for using the determined response if the text are comparable.

20. An interactive voice response (IVR) system comprising:

means for receiving a voice signal from a user interaction;

means for extracting a plurality of characteristics from a first portion of the voice signal over a time period, wherein the characteristics from the first portion of the voice signal include average formant information;

means for locating a reference characteristic matching said plurality of characteristics over said time period; and means for using text associated with the closest reference characteristic as an estimate of the text of the whole voice signal.

21. An IVR as claimed in claims 20 wherein the characteristics from the first portion of the voice signal include a first phoneme or first group of phonemes.

22. An IVR as claimed in claim 21 wherein formant information and the phoneme information is used together to estimate the text of the whole voice signal.

23. A computer program product, stored on a computer-readable storage medium, for executing computer program instructions to carry out the steps of:

receiving a voice signal from user interaction;

extracting a plurality of formant values from the voice signal over a time period;

calculating an average of said extracted formant values in the frequency domain over said time period;

locating a reference characteristic matching said average; and using a word or words associated with the closest reference characteristic as an estimate of the text of the voice signal.

* * * * *